(12) United States Patent
Hirano

(10) Patent No.: US 6,885,408 B2
(45) Date of Patent: Apr. 26, 2005

(54) IMAGE PROCESSING METHOD AND IMAGE PROCESSING APPARATUS

(75) Inventor: Tsuyoshi Hirano, Tokyo (JP)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 09/919,264

(22) Filed: Jul. 30, 2001

(65) Prior Publication Data

US 2002/0047917 A1 Apr. 25, 2002

(30) Foreign Application Priority Data

Jul. 31, 2000 (JP) ........................................ 2000-231607

(51) Int. Cl.$^7$ ................................................ H04N 7/08
(52) U.S. Cl. ...................... 348/588; 348/584; 348/563; 348/569; 348/564; 725/40; 725/43; 345/716
(58) Field of Search ................................ 348/584, 588, 348/564, 565, 563, 555, 556, 569, 465, 468, 473, 397.1, 423.1; 345/716, 783, 810, 855; 725/40, 39, 43, 137; 382/284

(56) References Cited

U.S. PATENT DOCUMENTS

| | | | |
|---|---|---|---|
| 5,109,279 A | * | 4/1992 | Ando .......................... 348/564 |
| 5,327,156 A | | 7/1994 | Masukane et al. |
| 5,579,057 A | | 11/1996 | Banker et al. |
| 5,608,864 A | | 3/1997 | Bindlish et al. |
| 5,751,371 A | * | 5/1998 | Shintani ....................... 348/564 |
| 5,781,247 A | * | 7/1998 | Wehmeyer et al. .......... 348/569 |
| 5,909,212 A | * | 6/1999 | Nishina et al. ................. 725/47 |
| 5,969,769 A | * | 10/1999 | Hamadate ..................... 348/568 |
| 5,990,860 A | * | 11/1999 | Takeuchi ...................... 345/667 |
| 6,057,888 A | | 5/2000 | Bril |
| 6,211,922 B1 | * | 4/2001 | Jun ............................. 348/569 |
| 6,330,036 B1 | * | 12/2001 | Murakami et al. ........... 348/555 |
| 6,348,951 B1 | * | 2/2002 | Kim ............................ 348/564 |
| 6,373,526 B1 | * | 4/2002 | Kessler et al. ............... 348/468 |
| 6,477,705 B1 | * | 11/2002 | Yuen et al. ................... 725/41 |
| 6,577,350 B1 | * | 6/2003 | Proehl et al. ................ 348/564 |
| 6,590,618 B1 | * | 7/2003 | Park et al. ................... 348/734 |
| 6,732,371 B1 | * | 5/2004 | Lee et al. ...................... 725/41 |

* cited by examiner

Primary Examiner—John Miller
Assistant Examiner—Jean W. Désir
(74) Attorney, Agent, or Firm—Frommer Lawrence & Haug LLP; William S. Frommer

(57) ABSTRACT

Disclosed is an image processing method and an image processing apparatus that improve quality of display images in different formats of a multi-format data broadcast image. The image processing method according to the present invention comprises the steps of: separating menu data, character data, still image data, and moving image data in a plurality of formats from a broadcast video signal; generating a layer image signal such that the image signal of data in each of the formats is superimposable on the data in the plurality of formats; and subjecting the superimposed layer image signal to adaptive image processing according to a preset parameter by means of an adaptive image processing unit. Therefore, by subjecting each layer to different image processing irrespective of the type and the format of the signal, it is possible to perform image processing adapted to each format.

23 Claims, 4 Drawing Sheets

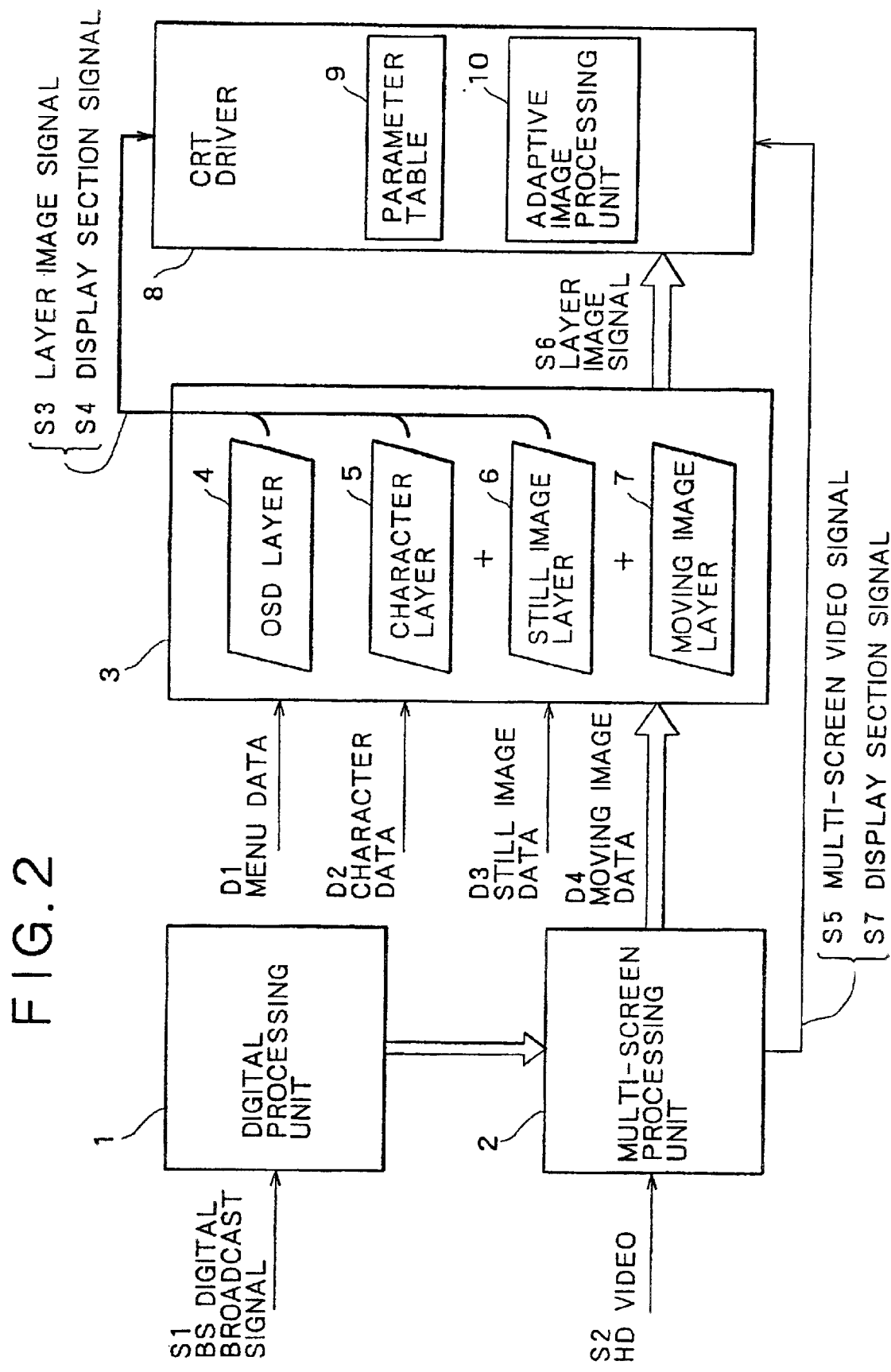

IMAGE PROCESSING METHOD AND IMAGE PROCESSING APPARATUS

BACKGROUND OF THE INVENTION

The present invention relates to an image processing method and an image processing apparatus suitable for a multi-format data broadcast image such as a digital broadcast image, for example.

A conventional television receiver has dealt with only single-format image signals, and thus has not processed image signals in different formats. However, BS digital broadcast requires processing of data broadcast data and still image broadcast data that are in a broadcast format different from that of a conventional image signal.

FIG. 1 shows a conventional multi-format data broadcast image. When a still image 44 and characters 45 are displayed together with a moving image 43 in the data broadcast image 42 on a single screen, an HD (High Definition) image 41 can be displayed with high quality, while edges of the still image 44 and the characters 45 shine, thus making the still image 44 and the characters 45 less easy to see.

However, when the still image 44 and the characters 45 are displayed together with the moving image 43 in the above-mentioned conventional multi-format data broadcast image 42 on a single screen, areas of the still image 44, the characters 45, and the moving image 43 cannot be distinguished from each other because the still image 44, the characters 45, and the moving image 43 are mixed with each other to form a single image. Therefore, the still image 44, the characters 45, and the moving image 43 cannot be processed independently of each other for higher image quality. This results in a disadvantage in that although the HD image 41 can be displayed with high quality, the still image 44 and the characters 45 are lowered in image quality.

SUMMARY OF THE INVENTION

It is accordingly an object of the present invention to provide an image processing method and an image processing apparatus that improve quality of display images in different formats of a multi-format data broadcast image.

The image processing method according to the present invention comprises the steps of: separating data in a plurality of formats from a broadcast video signal; generating a layer image signal such that the image signal of data in each of the formats is superimposable on the data in the plurality of formats; and subjecting the superimposed layer image signal to adaptive image processing according to a preset parameter.

Therefore, by subjecting each layer to different image processing irrespective of the type and the format of the signal, it is possible to perform image processing adapted to each format.

Also, the image processing method according to the present invention generates a display section signal for each layer image signal. Therefore, by determining a display area for each layer, it is possible to readily perform different image processing for each layer.

In addition, the image processing method according to the present invention generates the layer image signal and the display section signal on the basis of an arbitrarily changeable form. Therefore, it is possible to readily generate the signals on the basis of the changeable form.

Moreover, the image processing apparatus according to the present invention comprises: separating means for separating data in a plurality of formats from a broadcast video signal; layer image signal generating means for generating a layer image signal such that the image signal of data in each of the formats is superimposable on the data in the plurality of formats; and adaptive image processing means for subjecting the superimposed layer image signal to adaptive image processing according to a preset parameter.

Therefore, by subjecting each layer to different image processing irrespective of the type and the format of the signal, it is possible to perform image processing adapted to each format.

The image processing apparatus according to the present invention further includes storage means for storing a parameter in a table. Therefore, it is possible to make automatic setting for adaptive image processing.

In addition, the image processing apparatus according to the present invention sets a parameter according to the status of a layer image signal. Therefore, it is possible to adjust image quality by performing adaptive image processing according to the status of a layer image signal while viewing a data broadcast image on a television receiver.

Thus, according to the present invention, the following actions are performed.

The separating means subjects a video signal inputted thereto to digital processing to thereby separate menu data, character data, still image data, and moving image data. The separating means supplies the menu data, the character data, the still image data, and the moving image data to the layer image signal generating means.

The layer image signal generating means generates an OSD layer from the menu data, a character layer from the character data, a still image layer from the still image data, and a moving image layer from the moving image data. The layer image signal generating means generates an image signal for each of the OSD layer, the character layer, the still image layer, and the moving image layer.

The layer image signal generating means also generates a display section signal for each of the OSD layer, the character layer, and the still image layer, as well as layer image signals on which the OSD layer, the character layer, and the still image layer are superimposed. The layer image signal generating means supplies the display section signal for each of the layers and the superimposed layer image signals to the adaptive image processing means.

The adaptive image processing means reads preset image processing parameters stored in a parameter table in a table form. An image processing unit subjects each of the layer image signals to adaptive image processing for an area of its display section signal according to the parameters stored in the parameter table.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a configuration block diagram showing a multi-format adaptive image processing system to be applied to an embodiment of the present invention;

DETAILED DESCRIPTION OF THE PREFERRED EMBODIMENTS

Figure 1:
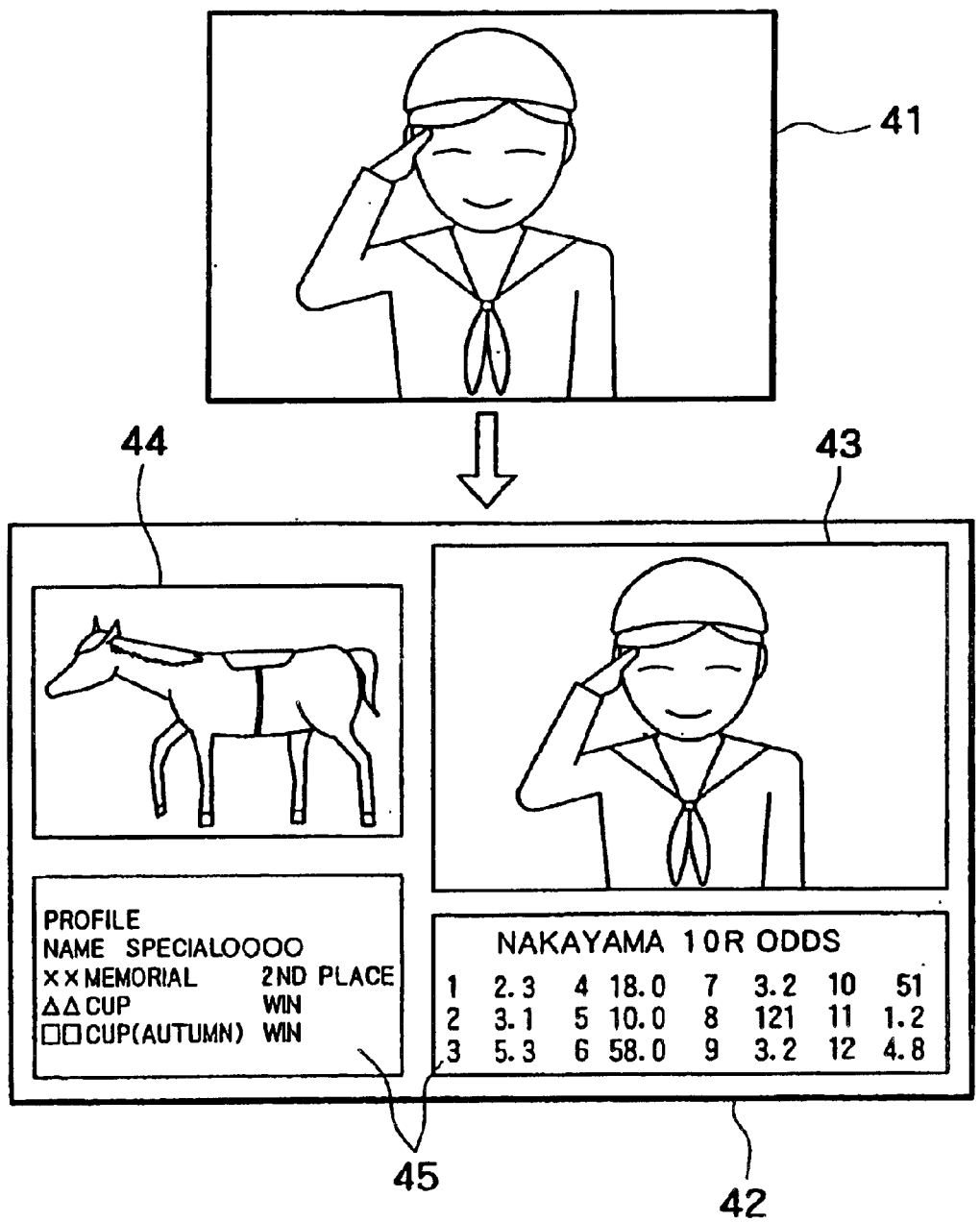
FIG. 1 shows a conventional multi-format data broadcast image.

An image processing method according to an embodiment of the present invention generates a layer image signal and a display section signal for each layer when displaying signals in different formats simultaneously on a single screen. The image processing method can thereby perform image processing with optimum image quality parameters for each display area to display the signals.

FIG. 2 shows configuration of a multi-format adaptive image processing system to be applied to the present embodiment. In this case, data in each format is sent by BS digital broadcast, for example.

A digital processing unit 1 in FIG. 2 subjects a BS digital broadcast signal S1 inputted thereto to digital processing to thereby separate menu data D1, character data D2, still image data D3, and moving image data D4.

A multi-screen processing unit 2 generates a multi-screen video signal S5 for multi-screen display and a display section signal S7 for the moving image data D4 from HD video S2 inputted to the multi-screen processing unit 2 and the moving image data D4 supplied from the digital processing unit 1.

A layer generating and media superimposing unit 3 generates an OSD (On Screen Display) layer 4 from the menu data D1 supplied from the digital processing unit 1, a character layer 5 from the character data D2, a still image layer 6 from the still image data D3, and a moving image layer 7 from the moving image data supplied from the multi-screen processing unit 2.

The layer generating and media superimposing unit 3 also generates a display section signal S4 for each of the OSD layer 4, the character layer 5, and the still image layer 6 as well as layer image signals S3 on which the OSD layer 4, the character layer 5, and the still image layer 6 are superimposed.

A CRT driver 8 reads preset image processing parameters stored in a parameter table 9 in a table form. An image processing unit 10 subjects each of the layer image signals S3 to optimum image processing for an area of its display section signal S4 according to the parameters stored in the parameter table 9. Also in the case of the multi-screen video signal S5, the CRT driver 8 performs optimum image processing using S5 and S7.

The thus formed multi-format adaptive image processing system applied to the present embodiment operates as follows. The multi-format adaptive image processing will be described in the following with reference to FIGS. 3A, 3B, and 3C.

Figure 3A:
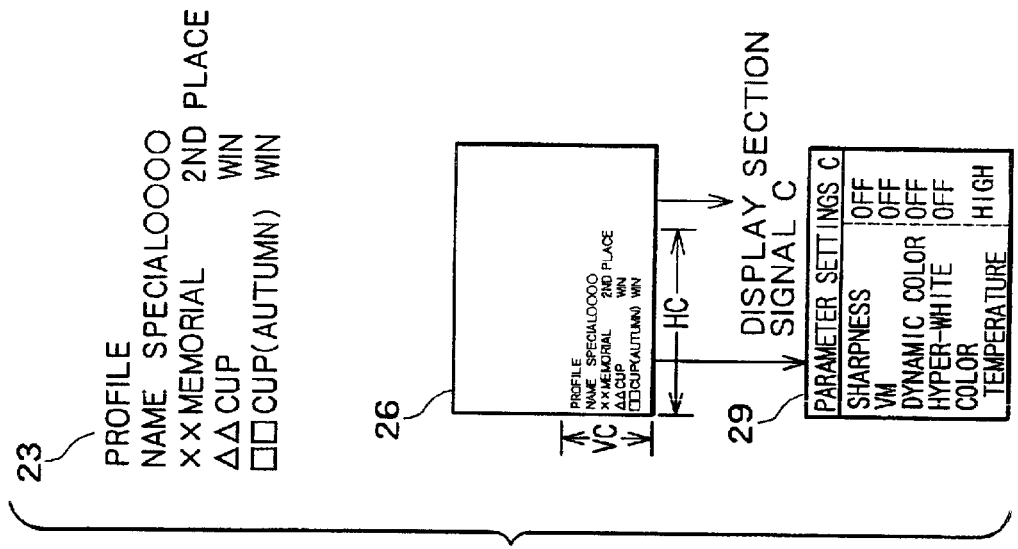
FIGS. 3A, 3B, and 3C illustrate layer pasting of multi-format data and parameter setting for each layer, FIG. 3A showing a moving image, FIG. 3B showing a still image, and FIG. 3C showing characters.
Figure 3B:
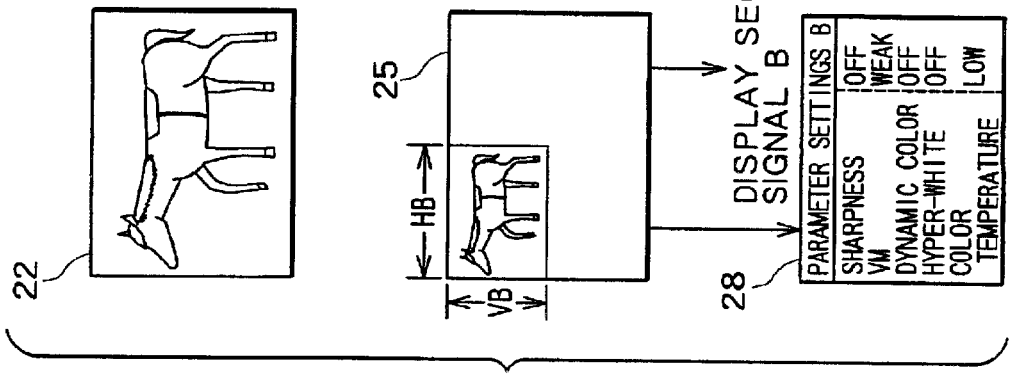
Figure 3C:
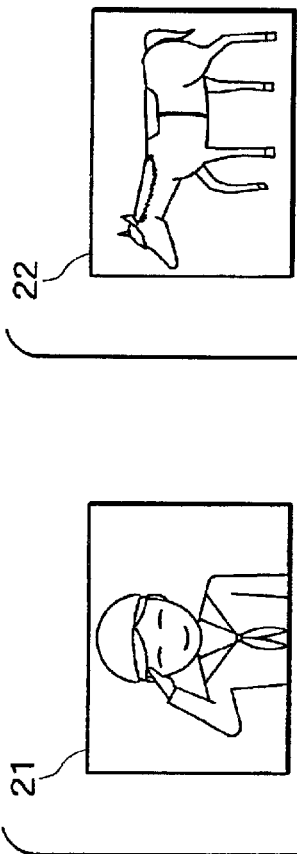

FIGS. 3A, 3B, and 3C illustrate layer pasting of multi-format data and parameter setting for each layer. FIG. 3A shows a moving image; FIG. 3B shows a still image; and FIG. 3C shows characters.

The digital processing unit 1 in FIG. 2 subjects the BS digital broadcast signal S1 inputted thereto to digital processing to thereby separate the menu data D1, the character data D2, and the still image data D3. The digital processing unit 1 supplies the menu data D1, the character data D2, and the still image data D3 to the layer generating and media superimposing unit 3.

In this case, the still image data D3 corresponds to the still image 22 shown in FIG. 3B, and the character data D2 corresponds to the characters 23 shown in FIG. 3C.

The multi-screen processing unit 2 generates the multi-screen video signal S5 and the display section signal S7 from the HD video S2 inputted to the multi-screen processing unit 2 and the moving image data D4 supplied from the digital processing unit 1. The multi-screen processing unit 2 supplies the moving image data D4 to the layer generating and media superimposing unit 3, and supplies the multi-screen video signal S5 and the display section signal S7 to the CRT driver 8.

For simplicity, FIG. 3A shows a single frame of moving image.

In this case, the moving image data corresponds to the high-quality moving image 21 shown in FIG. 3A.

The layer generating and media superimposing unit 3 generates the OSD layer 4 from the menu data D1 supplied from the digital processing unit 1, the character layer 5 from the character data D2, the still image layer 6 from the still image data D3, and the moving image layer 7 from the moving image data D4 supplied from the multi-screen processing unit 2. The layer generating and media superimposing unit 3 then supplies the OSD layer 4, the character layer 5, the still image layer 6, and the moving image layer 7 to the CRT driver 8.

In FIGS. 3A, 3B, and 3C, the OSD layer does not have data, and therefore the OSD layer is not shown in the figures.

In this case, the character layer 5 corresponds to a character layer 26 shown in FIG. 3C; the still image layer 6 corresponds to a still image layer 25 shown in FIG. 3B; and the moving image layer 7 corresponds to a moving image layer 24 shown in FIG. 3A. Images of the layers are thus pasted to the display area.

Incidentally, each of the layer image signals may be set into a preset, arbitrarily changeable form.

The layer generating and media superimposing unit 3 also generates a display section signal S4 for each of the OSD layer 4, the character layer 5, and the still image layer 6 as well as the layer image signals S3 on which the OSD layer 4, the character layer 5, and the still image layer 6 are superimposed. The layer generating and media superimposing unit 3 supplies the display section signal S4 for each of the layers and the superimposed layer image signals S3 to the CRT driver 8.

In this case, the display section signal S4 for the character layer 5 corresponds to a display section signal C of horizontal HC×vertical VC shown in FIG. 3C; the display section signal S4 for the still image layer 6 corresponds to a display section signal B of horizontal HB×vertical VB shown in FIG. 3B; and the display section signal S4 for the moving image layer 7 corresponds to a display section signal A of horizontal HA×vertical VA shown in FIG. 3A.

Incidentally, each of the display section signals may be outputted so as to correspond to a preset, arbitrarily changeable form.

The CRT driver 8 reads preset image processing parameters stored in the parameter table 9 in a table form. The image processing unit 10 subjects each of the layer image signals S3 to optimum image processing for an area of its display section signal S4 according to the parameters stored in the parameter table 9.

In this case, parameter settings stored in the parameter table 9 are: parameter settings C (29) for the character layer 26 shown in FIG. 3C; parameter settings B (28) for the still image layer 25 shown in FIG. 3B; and parameter settings A (27) for the moving image layer 24 shown in FIG. 3A.

In this case, in the parameter settings C (29) for the character layer 26, image processing for sharpness, VM, dynamic picture, and hyper-white is off and therefore is not performed, while color temperature is set relatively high.

In the parameter settings B (28) for the still image layer 25, image processing for sharpness, dynamic picture, and hyper-white is off and therefore is not performed, VM image processing is performed relatively weakly, and color temperature is set relatively low.

In the parameter settings A (27) for the moving image layer 24, sharpness image processing is performed moderately, VM image processing is performed relatively strongly, image processing for dynamic picture and hyper-white is on and therefore is performed, and color temperature is set relatively high.

It is to be noted that the sharpness processing enhances image sharpness. The VM processing provides a three-dimensional appearance to the image by slowing a sweep rate when luminance difference is large and normalizing the sweep rate when luminance difference is small. The dynamic picture processing makes details clear by setting a portion of the lowest (black) level in a signal as black. The hyper-white processing enhances white level. The color temperature processing renders white in a movie and other images sepia.

Figure 4:
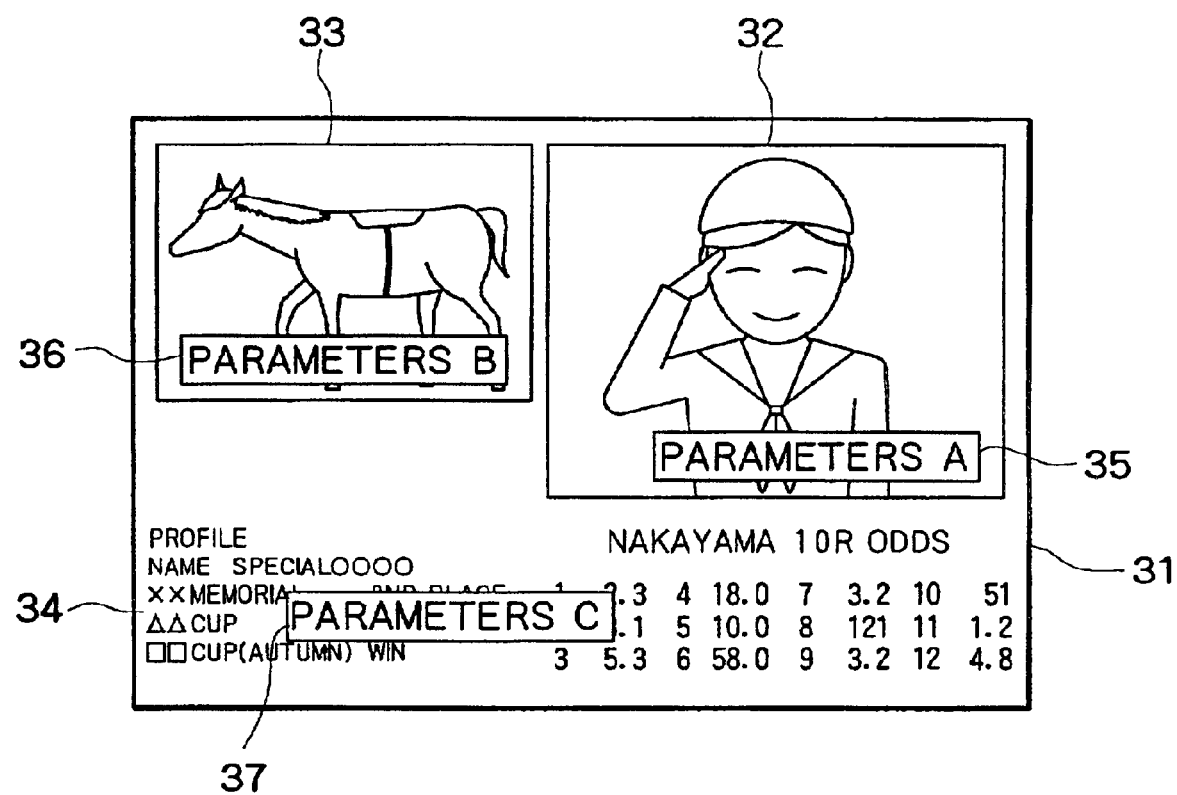
FIG. 4 shows an adaptive processed multi-format data broadcast image.

FIG. 4 shows an adaptive processed multi-format data broadcast image after being subjected to the above image processing.

A data broadcast image 31 in FIG. 4 displays a moving image 32 subjected to the adaptive image processing with parameters A (35), a still image 33 subjected to the adaptive image processing with parameters B (36), and characters 34 subjected to the adaptive image processing with parameters C (37).

In this case, since according to the set parameters A (35), the sharpness processing is performed moderately, the sharpness of the moving image 32 is set to a moderate level. Since the VM processing is performed relatively strongly, the sweep rate is slowed relatively strongly when luminance difference is large and is normalized relatively strongly when luminance difference is small. Since the dynamic picture processing is performed, the lowest black level is raised to make details clear. Since the hyper-white processing is performed, white level is enhanced. Since the color temperature is set relatively high, white in a movie and other images is rendered sepia.

Since according to the set parameters B (36), the sharpness processing is not performed, the sharpness of the still image 33 is set to a low level. Since the VM processing is performed relatively weakly, the sweep rate is slowed relatively weakly when luminance difference is large and is normalized relatively weakly when luminance difference is small. Since the dynamic picture processing is not performed, black level is not changed. Since the hyper-white processing is not performed, white level is not enhanced. Since the color temperature is set relatively low, white remains as it is.

Since according to the set parameters C (37), the sharpness processing is not performed, the sharpness of the characters 34 is set to a low level. Since the VM processing is not performed, the sweep rate is not slowed even when luminance difference is large and is not normalized even when luminance difference is small. Since the dynamic picture processing is not performed, black level is not changed. Since the hyper-white processing is not performed, white level is not enhanced. Since the color temperature is set relatively high, white is rendered sepia.

Thus, since the layer image signal and the display section signal are generated for each of the layers, the image processing unit in the succeeding stage can determine an image processing area by means of the display section signal. This allows the above-described adaptive image processing for sharpness, VM, dynamic picture, hyper-white, and color temperature to be performed for each of the layers according to the set parameters A (35), B (36), or C (37).

It is to be noted that the parameter settings are not limited to those described above; the parameter settings may be changed for each layer and according to the status of a layer image signal. This makes it possible to adjust image quality by performing adaptive image processing according to the status of a layer image signal while viewing a data broadcast image on a television receiver.

Also, the kinds and descriptions of parameters are not limited to those described above; other image processing for enhancing or blurring an edge of an image and image processing in a Y system, a color difference system, and an R, G, and B system may be used.

In addition, the image quality of a still image may be improved so as to match the high quality of a moving image by performing interpolation processing and the like.

Moreover, another image may be used as a background in the display section area for characters.

Furthermore, a moving image, a still image, and character data may be inputted from a recording apparatus such as a digital camera or a personal computer.

It is also to be noted that the present embodiment has been described by taking only BS digital broadcast as an example; however, the present invention is of course applied to terrestrial digital broadcasts and cable digital broadcasts.

In addition, optimum image processing between moving images can be performed by using a multi-screen function. Even when an NTSC (narrow video band) image is displayed on a left screen and an HD (wide video band) image is displayed on a right screen, a video parameter for the left screen and a video parameter for the right screen can be set independently of each other.

While a preferred embodiment of the present invention has been described using specific terms, such description is for illustrative purposes only, and it is to be understood that changes and variations may be made without departing from the spirit or scope of the following claims.

What is claimed is:

1. An image processing method comprising the steps of:
    separating data in a plurality of formats from a broadcast video signal;
    generating a plurality of layer image signals for data in said plurality of formats such that each of the plurality of image signals of data in each of the formats is superimposable on said data in the plurality of formats; and
    adaptively processing said each layer image signal according to preset parameters to enable parameters of said each layer image signal to be individually optimally adjusted for viewing, said preset parameters including a sweep rate of said each layer image signal, wherein the sweep rate is adjusted in accordance with a luminance difference.

2. An image processing method as claimed in claim 1, further comprising:
    generating a display section signal for said each layer image signal.

3. An image processing method as claimed in claim 1, wherein said each layer image signal is generated on the basis of an arbitrarily changeable form.

4. An image processing method as claimed in claim 2, wherein said display section signal is generated on the basis of an arbitrarily changeable form.

5. An image processing method as claimed in claim 1, wherein said preset parameters are stored in a table.

6. An image processing method as claimed in claim 1, wherein said preset parameters are set according to status of said each layer image signal.

7. An image processing method as claimed in claim 1, wherein said data in the plurality of formats is inputted from a recording apparatus.

8. An image processing method as claimed in claim 1, further comprising:

superimposing said plurality of layer image signals to output a processed multi-format data broadcast signal.

9. An image processing method as claimed in claim 1, wherein said preset parameters include sharpness of said each layer image signal.

10. An image processing method as claimed in claim 9, wherein said sharpness of a still image is set to a low level.

11. An image processing method as claimed in claim 9, wherein said sharpness of a text image is set to a low level.

12. An image processing method as claimed in claim 9, wherein said sharpness of a moving image is set to a moderate level.

13. An image processing method as claimed in claim 1, wherein said sweep rate of said each layer image signal is slowed relatively strongly when a luminance difference is large.

14. An image processing method as claimed in claim 1, wherein said sweep rate of said each layer image signal is normalized relatively weakly when a luminance difference is small.

15. An image processing method as claimed in claim 1, wherein said preset parameters include color temperature of said each layer image signal.

16. An image processing apparatus comprising:

separating means for separating data in a plurality of formats from a broadcast video signal;

layer image signal generating means for generating a plurality of layer image signals for data in said plurality of formats such that each of the plurality of image signals of data in each of the formats is superimposable on said data in the plurality of formats; and adaptive image processing means for adaptively image processing said each layer image signal according to preset parameters to enable parameters of said each layer image signal to be individually optimally adjusted for viewing, said preset parameters including a sweep rate of said each layer image signal, wherein the sweep rate is adjusted in accordance with a luminance difference.

17. An image processing apparatus as claimed in claim 16, further including display section signal generating means for generating a display section signal for said each layer image signal.

18. An image processing apparatus as claimed in claim 16, wherein said each layer image signal is generated on the basis of an arbitrarily changeable form.

19. An image processing apparatus as claimed in claim 17, wherein said display section signal is generated on the basis of an arbitrarily changeable form.

20. An image processing apparatus as claimed in claim 16, further including storage means for storing said preset parameters in a table.

21. An image processing apparatus as claimed in claim 16, wherein said preset parameters are set according to status of said each layer image signal.

22. An image processing apparatus as claimed in claim 16, wherein said data in the plurality of formats is inputted from a recording apparatus.

23. An image processing apparatus as claimed in claim 16, further comprising:

superimposing means for superimposing said plurality of layer image signals to output a processed multi-format data broadcast signal.

* * * * *